United States Patent
Kim et al.

(10) Patent No.: US 6,180,547 B1
(45) Date of Patent: Jan. 30, 2001

(54) HIGH DIELECTRIC CERAMIC COMPOSITION

(75) Inventors: Ho Gi Kim; Yung Park, both of Seoul (KR); Kevin Knowles, Cambridge (GB)

(73) Assignee: Korea Advanced Institute of Science and Technology, Taejeon (KR)

( * ) Notice: Under 35 U.S.C. 154(b), the term of this patent shall be extended for 0 days.

(21) Appl. No.: 09/393,207

(22) Filed: Sep. 9, 1999

(51) Int. Cl.$^7$ ................................................. C04B 35/497
(52) U.S. Cl. ............................................................ 501/134
(58) Field of Search ................................................. 501/134

(56) References Cited

U.S. PATENT DOCUMENTS 4,379,309  *  4/1983  Wilson ................................. 501/134
5,786,048  *  7/1998  Gesemann et al. .................. 501/134

* cited by examiner

*Primary Examiner*—Karl Group
(74) *Attorney, Agent, or Firm*—Skjerven Morrill MacPherson LLP; David T. Millers

(57) ABSTRACT

Disclosed is a high dielectric capacitor composition consisting of $Pb(Fe_{1/2}Nb_{1/2})O_3$, $Pb(Fe_{1/2}Ta_{1/2})O_3$, $Pb(Ni_{1/3}Nb_{2/3})O_3$ and $Pb(Zn_{1/3}Nb_{2/3})O_3$ in association with manganese nitrate $(Mn(NO_3)_2.4H_2O)$. It has a dielectric constant of 10,000 or higher with a relatively low loss factor of 2.6% or less, showing the temperature properties of Y5V.

3 Claims, No Drawings under sintering temperatures lower than 1100°C.

HIGH DIELECTRIC CERAMIC COMPOSITION

BACKGROUND OF THE INVENTION

1. Field of the invention

The present invention relates, in general, to a high dielectric ceramic composition and, more particularly, to a high dielectric ceramic composition which is superior in temperature properties with a low loss factor and can be sintered at low temperatures.

2. Description of Prior Art

Generally, a laminated ceramic capacitor is prepared by molding a dielectric ceramic raw material powder into a green sheet, printing on the green sheet a conductive paste comprised of a precious metal such as platinum or palladium, laminating a plurality of such green sheets under pressure, and sintering the lamination at 1,300~1,400° C. The precious metal, such as platinum or palladium, used as an internal electrode, however, is very expensive, causing an increase in the production cost of such laminated ceramic condensers.

In order to produce a laminated ceramic condenser at a reduced cost, there were suggested Pb-based, low temperature-sintered dielectrics whose internal electrodes were made of a high content of Ag. These dielectrics can be sintered at low temperatures, but suffer from a disadvantage of having dielectric loss factors as high as 3~6%. The conventional dielectrics can be found in many reports (for example, T. R. Shrout and A. Halliyal, "Preparation of Lead-based Ferroelectric Relaxors for Capacitors", Am. Ceram. Soc. Bull., 66[4], 704 (1987); and M. T. Lanagan, N, Yang, D. C. Dube, and S. J. Jang, "Dielectric Behavior of the Relaxor Pb[Mg$_{1/3}$Nb$_{2/3}$]O$_3$–PbTiO$_3$ Solid-Solution System in the Microwave Region", J. Am. Ceram. Soc., 72[3], 481–83 (1989)).

SUMMARY OF THE INVENTION

Therefore, it is an object of the present invention to overcome the problems encountered in prior art and to provide a dielectric capacitor composition which can be sintered at low temperatures and shows stable temperature characteristics in the range of operation temperatures with high dielectric constants.

It is another object of the present invention to provide a dielectric relaxor for capacitors, which meets the U.S. Industrial Standards, Z5U, Y5V and Y5S and has a low dielectric loss factor.

Based on the present invention, the above objects could be accomplished by a provision of a high dielectric ceramic composition, consisting of four components, Pb(Fe$_{1/2}$Nb$_{1/2}$)O$_3$, Pb(Fe$_{1/2}$Ta$_{1/2}$)O$_3$, Pb(Ni$_{1/3}$Nb$_{2/3}$)O$_3$ and Pb(Zn$_{1/3}$Nb$_{2/3}$)O$_3$, in association with manganese nitrate (Mn(NO$_3$)$_2$.4H$_2$O).

DETAILED DESCRIPTION OF THE INVENTION

The present invention contemplates a ceramic composition which is of a tetra-component system, each component being based on Pb(B$_1$,B$_2$)O$_3$. Coming from combinations of lead oxide (PbO), ferric oxide (Fe$_2$O$_3$), niobium penta oxide (Nb$_2$O$_5$), tantalum penta oxide (Ta$_2$O$_5$), nickel oxide (NiO) and zinc oxide (ZnO), the tetra-component system consists of Pb(Fe$_{1/2}$Nb$_{1/2}$)O$_3$, Pb(Fe$_{1/2}$Ta$_{1/2}$)O$_3$, Pb(Ni$_{1/3}$Nb$_{2/3}$)O$_3$, and Pb(Zn$_{1/3}$Nb$_{2/3}$)O$_3$. In this tetra-component system, Pb(Fe$_{1/2}$Nb$_{1/2}$)O$_3$ has a function of raising the phase transition temperature to a high temperature, Pb(Fe$_{1/2}$Ta$_{1/2}$)O$_3$ of allowing low loss factors at low temperatures, Pb(Ni$_{1/3}$Nb$_{2/3}$)O$_3$ of reducing the temperature-dependent characteristics of the dielectric constant, and Pb(Zn$_{1/3}$Nb$_{2/3}$)O$_3$ of preventing the lowering of the dielectric constant. In addition, a transition metal, such as manganese, even in a small quantity, can contribute to a significant improvement in electric resistance and dielectric loss factor of the ceramic composition.

The dielectric ceramic composition of the present invention can be sintered at a temperature less than 1,100° C. and has a high dielectric constant enough to meet the temperature characteristics which show a maximum of allowable change rate of 22%–56% at a revision temperature range of 10° C.~85° C. and 22%~82% at a revision temperature range of –30° C.~85° C.

EXAMPLE

After lead oxide (PbO), ferric oxide (Fe$_2$O$_3$), niobium pentaoxide (Nb$_2$O$_5$), tantalum pentaoxide (Ta$_2$O$_5$), nickel oxide (NiO), zinc oxide (ZnO), and manganese nitrate (Mn(NO$_3$)$_2$.4H$_2$O), all being 99.9% or higher pure, were weighed, tetra-component systems consisting of xPb(Fe$_{1/2}$Nb$_{1/2}$)O$_3$–yPb(Fe$_{1/2}$Ta$_{1/2}$)O$_3$–zPb(N$_{1/3}$Nb$_{2/3}$)O$_3$–ΩPb(Zn$_{1/3}$Nb$_{2/3}$)O$_3$ were obtained in such a way that the mole ratios of individual components met the conditions of $0.15 \leq x \leq 0.63$, $0.02 \leq y \leq 0.8$, $0.06 \leq z \leq 0.35$ and $0.1 \leq \Omega \leq 0.26$, and added with manganese nitrate (Mn(NO$_3$)$_2$.4H$_2$O according to the indication of Table 1, below. The resulting compositions were mixed for 2 hours in a planetary mill using a nylon jar and zirconium oxide (ZrO$_2$) balls. Upon mixing, acetone was used as a dispersing medium. The slurries thus obtained were calcined at a temperature of 700~800° C. and pulverized into powders with suitable particle sizes.

These powders were molded under a pressure of 700 kg/cm$^2$ into specimens 1 mm thick with a diameter of 12 mm, after which they were sintered at temperatures of 950~1,100° C. while being printed with a paste mixture of Ag:Pd 70:30 to form an electrode. The ceramic capacitors thus obtained were tested for electric properties and the results are given as shown in Table 1, below.

A better understanding of the present invention may be obtained in light of the following examples which are set forth to illustrate, but are not to be construed to limit the present invention.

COMPARATIVE EXAMPLE

After lead oxide (PbO), ferric oxide (Fe$_2$O$_3$), niobium pentaoxide (Nb$_2$O$_5$), tantalum pentaoxide (Ta$_2$O$_5$), nickel oxide (NiO), zinc oxide (ZnO), and manganese nitrate (Mn(NO$_3$)$_2$.4H$_2$O), all being 99.9% or higher pure, were weighed, ceramic capacitor compositions comprising xPb(Fe$_{1/2}$Nb$_{1/2}$)O$_3$, yPb(Fe$_{1/2}$Ta$_{1/2}$)O$_3$, zPb(Ni$_{1/3}$, Nb$_{2/3}$)O$_3$, and/or ΩPb(Zn$_{1/3}$Nb$_{2/3}$)O$_3$ were obtained and added with manganese nitrate (Mn(NO$_3$)$_2$.4H$_2$O according to the indication of Table 1, below. These resulting compositions followed the same procedure as in Example.

TABLE 1

Compositions and Dielectric Properties

| Nos. of Samples | Composition Ratios | | | | $Mn(NO_3)_2 \cdot 4H_2O$ (Cation %) | Sinter. Temp. (° C.) | Dielectric Constant (at 25° C.) | Dielectric Loss Factor (at 25° C.) | Specific Resist. ($\Omega \cdot cm$) (at 25° C.) |
|---|---|---|---|---|---|---|---|---|---|
| | X | Y | Z | $\Omega$ | | | | | |
| 1* | 0.6 | | 0.4 | | 0.17 | 1000 | 7229 | 0.3 | 5.9 × 10E9 |
| 2* | 0.5 | 0.1 | 0.4 | | 0.17 | 1000 | 3028 | 0.4 | 5.6 × 10E10 |
| 3 | 0.54 | 0.09 | 0.27 | 0.1 | 0.15 | 1030 | 13072 | 0.6 | 1.7 × 10E9 |
| 4 | 0.54 | 0.09 | 0.27 | 0.1 | 0.15 | 1060 | 13277 | 0.7 | 2.3 × 10E9 |
| 5 | 0.54 | 0.09 | 0.27 | 0.1 | 0.15 | 1100 | 19462 | 0.8 | 2.8 × 10E10 |
| 6* | 0.51 | 0.15 | 0.23 | 0.11 | 0.15 | 1000 | 4598 | 0.9 | 6.7 × 10E9 |
| 7* | 0.51 | 0.15 | 0.23 | 0.11 | 0.15 | 1020 | 4756 | 1.0 | 1.0 × 10E9 |
| 8* | 0.51 | 0.15 | 0.23 | 0.11 | 0.15 | 1050 | 6463 | 0.8 | 2.0 × 10E9 |
| 9 | 0.5 | 0.2 | 0.2 | 0.1 | 0.15 | 1000 | 10634 | 0.6 | 1.2 × 10E10 |
| 10 | 0.5 | 0.2 | 0.2 | 0.1 | 0.15 | 1030 | 13526 | 0.6 | 2.4 × 10E10 |
| 11 | 0.5 | 0.2 | 0.2 | 0.1 | 0.15 | 1060 | 19353 | 1.0 | 2.3 × 10E10 |
| 12 | 0.5 | 0.2 | 0.2 | 0.1 | 0.15 | 1020 | 17802 | 0.5 | 1.5 × 10E10 |
| 13 | 0.5 | 0.2 | 0.2 | 0.1 | 0.15 | 1100 | 17683 | 0.8 | 2.4 × 10E10 |
| 14 | 0.4 | 0.3 | 0.17 | 0.13 | 0.15 | 1000 | 13277 | 1.1 | 2.3 × 10E9 |
| 15 | 0.4 | 0.3 | 0.17 | 0.13 | 0.15 | 1020 | 14834 | 1.0 | 1.4 × 10E10 |
| 16 | 0.4 | 0.3 | 0.17 | 0.13 | 0.15 | 1080 | 16406 | 0.5 | 5.5 × 10E9 |
| 17 | 0.4 | 0.3 | 0.17 | 0.13 | 0.15 | 1100 | 17454 | 0.9 | 7.4 × 10E9 |
| 18* | 0.28 | 0.44 | 0.11 | 0.17 | 0.15 | 1020 | 11061 | 0.7 | 7.1 × 10E10 |
| 19* | 0.34 | 0.38 | 0.13 | 0.15 | 0.15 | 1100 | s.i.[a] | | |
| 20 | 0.25 | 0.51 | 0.08 | 0.16 | 0.15 | 1000 | 15468 | 0.6 | 2.0 × 10E10 |
| 21 | 0.25 | 0.51 | 0.08 | 0.16 | 0.15 | 1020 | 17323 | 1.0 | 1.2 × 10E10 |
| 22 | 0.25 | 0.51 | 0.08 | 0.16 | 0.15 | 1080 | 18256 | 0.8 | 1.3 × 10E10 |
| 23 | 0.25 | 0.51 | 0.08 | 0.16 | 0.15 | 1100 | 19582 | 0.8 | 6.7 × 10E9 |
| 24 | 0.15 | 0.52 | 0.07 | 0.26 | 0.15 | 1000 | 11550 | 0.7 | 3.0 × 10E9 |
| 25 | 0.15 | 0.52 | 0.07 | 0.26 | 0.15 | 1020 | 15307 | 0.4 | 2.8 × 10E9 | x: $PbFe_{1/2}Nb_{1/2}O_3$,
y: $PbFe_{1/2}Ta_{1/2}O_3$,
z: $PbNi_{1/3}Nb_{2/3}$,
$\Omega$: $PbZn_{1/3}Nb_{2/3}O_3$
*Comparative Example,
[a]sintering impossible,
10EX=10

In Table 1, the dielectric constant (K) and dielectric loss factor were obtained using an LCR meter at 25° C. with 1 kHz while the specific resistance was measured at a direct current voltage of 100 volts with the aid of a high resistance meter.

Sample Nos. 1 and 2, used as comparatives, were a bi-component system consisting of $0.6Pb(Fe_{1/3}Nb_{2/3})O_3$–$0.4Pb(Ni_{1/3}Nb_{2/3})O_3$ added with 0.17 cation % of manganese nitrate $(Mn(NO_3)_2 \cdot 4H_2O)$ and a tri-component system consisting of $0.5Pb(Fe_{1/3}Nb_{2/3})O_3$–$0.1Pb(Fe_{1/2}Ta_{1/2})O_3$–$0.4Pb(Ni_{1/3}Nb_{2/3})O_3$ added with 0.17 cation % of manganese nitrate $(Mn(NO_3)_2 \cdot 4H_2O)$, respectively. They were determined to have dielectric constants (K) of 7229 and 3028 and dielectric loss factors (tanδ) of 0.3% and 0.4%, respectively.

Sample Nos. 6, 7 and 8, used as comparatives, all were a tetra-component system consisting of $0.51Pb(Fe_{1/2}Nb_{1/2})O_3$–$0.15Pb(Fe_{1/2}Ta_{1/2})O_3$–$0.23Pb(Ni_{1/3}Nb_{2/3})O_3$–$0.11Pb(Zn_{1/3}Nb_{2/3})O_3$ added with 0.15 cation % of manganese nitrate $(Mn(NO_3)_2 \cdot 4H_2O)$. They were measured to range, in dielectric constant, from 4598 to 6463 and, in dielectric loss factor (tanδ), from 0.8 to 1.0%.

Sample No. 19, used as a comparative, consisting of $0.34Pb(Fe_{1/2}Nb_{1/2})O_3$–$0.38Pb(Fe_{1/2}Ta_{1/2})O_3$–$0.13Pb(Ni_{1/3}Nb_{2/3})O_3$–$0.15Pb(Zn_{1/3}Nb_{2/3})O_3$ added with 0.15 cation % of manganese nitrate $(Mn(NO_3)_2 \cdot 4H_2O)$, was virtually impossible to sinter at 1,100° C. or less.

In association of 0.15 cation % of manganese nitrate $(Mn(NO_3)_2 \cdot 4H_2O)$, sample Nos. 3 to 5, 9 to 18 and 20 to 25, all being tetra-component systems consisting of $Pb(Fe_{1/2}Nb_{1/2})O_3$–$Pb(Fe_{1/2}Ta_{1/2})O_3$–$Pb(Ni_{1/3}Nb_{2/3})O_3$–$Pb(Zn_{1/3}Nb_{2/3})O_3$ whose mole ratios are in the range as determined above according to the present invention, showed far higher or lower dielectric loss factors and far higher dielectric constants (K) than did the comparatives.

Of the four components, $Pb(Fe_{1/2}Nb_{1/2})O_3$ preferably ranges, in mole ratio, from 0.15 to 0.63. A mole ratio out of this range makes the phase transition temperature deviated away from room temperature. A mole ratio of 0.02 to 0.8 for $Pb(Fe_{1/2}Ta_{1/2})O_3$ is determined to obtain relatively low loss factors at low temperatures. If the mole ratio of $Pb(Fe_{1/2}Ta_{1/2})O_3$ is not within this range, the phase transition temperature is shifted from room temperature toward low temperatures too much to obtain a desirable composition. Higher than 0.26 in the mole ratio for $Pb(Zn_{1/3}Nb_{2/3})O_3$ causes the formation of a pyrochlore phase, resulting in a decrease in dielectric constant. The mole ratios of $Pb(Ni_{1/3}Nb_{2/3})O_3$, if they are out of the range of 0.06 to 0.35, make the phase transition temperature separated away from room temperature, increasing the sintering temperature. As mentioned above, the present invention is characterized in a tetra-component system which consists of $Pb(Fe_{1/2}Nb_{1/2})O_3$ which functions to increase the phase transition temperature to a higher one, $Pb(Fe_{1/2}Nb_{1/2})O_3$ which functions to allow low loss factors at low temperatures, $Pb(Ni_{1/3}Nb_{2/3})O_3$ which functions to lessen the temperature dependence of dielectric constant, and $Pb(Zr_{1/3}Nb_{2/3})O_3$ which functions to be preventive of dielectric constant reduction, can be sintered at a temperature less than 1,100° C. and show a maximum of allowable change rate of +22%–56% in a revision temperature range of +10~+85° C. and a maximum of allowable change rate of +22%–82% in a revision temperature range of −30~+85° C. when $Pb(Fe_{1/2}Nb_{1/2})O_3$ ranges, in mole ratio, from 0.15 to 0.63, $Pb(Fe_{1/2}Ta_{1/2})O_3$ from 0.02 to 0.8, $Pb(Ni_{1/3}Nb_{2/3})O_3$ from 0.06 to 0.35, and $Pb(Zn_{1/3}Nb_{2/3})O_3$ from 0.1 to 0.26, in association with 0.15 cation % of manganese nitrate $(Mn(NO_3)_2.4H_2O)$. In addition, this system has a high dielectric constant, so that even a small number of internal electrodes are sufficient to provide a large capacity, contributing to miniaturization. Further, a reduction can be brought about in the production cost. Furthermore, a low loss factor is formed between electrodes, leads to preventing a loss increase at low temperatures. Therefore, the dielectric ceramic capacitor according to the present invention is much improved in electrical properties with a high dielectric constant.

As described hereinbefore, the present invention provides a high dielectric ceramic composition which consists of four components, $Pb(Fe_{1/2}Nb_{1/2})O_3$ for increasing the phase transition temperature of the composition to a higher one, $Pb(Fe_{1/2}Nb_{1/2})O_3$ for allowing low loss factors at low temperatures, $Pb(Ni_{1/3}Nb_{2/3})O_3$ for lessening the temperature dependence of dielectric constant, and $Pb(Zn_{1/3}Nb_{2/3})O_3$ for preventing dielectric constant reduction, in association with a transition metal, such as manganese, to improve the electric resistance and dielectric loss factor. This composition can be sintered at 1,100° C. or less and has a high dielectric constant enough to show a maximum of allowable change rate of +22%–82% in a revision temperature range of +10~+85° C.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A high dielectric ceramic composition, consisting of four components, $Pb(Fe_{1/2}Nb_{1/2})O_3$, $Pb(Fe_{1/2}Ta_{1/2})O_3$, $Pb(Ni_{1/3}Nb_{2/3})O_3$ and $Pb(Zn_{1/3}Nb_{2/3})O_3$, in association with manganese nitrate $(Mn(NO_3)_2.4H_2O)$.

2. A high dielectric ceramic composition as set forth in claim 1, wherein said four components, $Pb(Fe_{1/2}Nb_{1/2})O_3$, $Pb(Fe_{1/2}Ta_{1/2})O_3$, $Pb(Ni_{1/3}Nb_{2/3})O_3$ and $Pb(Zn_{1/3}Nb_{2/3})O_3$, have a molar ratio of 0.15~0.63, 0.02~0.8, 0.06~0.35, and 0.1~0.26, respectively.

3. A high dielectric ceramic composition as set forth in claim 1, wherein said manganese nitrate $(Mn(NO_3)_2.4H_2O)$ is added at an amount of 0.17 cation % or less.

* * * * *